(12) United States Patent
Svetlik, III

(10) Patent No.: US 7,879,248 B2
(45) Date of Patent: Feb. 1, 2011

(54) FILTERING SYSTEMS WITH INTEGRAL FILTER BACK-FLUSHING

(76) Inventor: Rudy James Svetlik, III, 11918 Westlock Dr., Tomball, TX (US) 77377

( * ) Notice: Subject to any disclaimer, the term of this patent is extended or adjusted under 35 U.S.C. 154(b) by 518 days.

(21) Appl. No.: 11/801,252

(22) Filed: May 8, 2007

(65) Prior Publication Data
US 2008/0277357 A1 Nov. 13, 2008

(51) Int. Cl.
*B01D 29/52* (2006.01)
*B01D 17/12* (2006.01)
*B01D 29/66* (2006.01)
*B01D 35/22* (2006.01)
*C02F 1/00* (2006.01)

(52) U.S. Cl. .................. 210/798; 210/106; 210/108; 210/333.1; 210/341; 210/121; 210/123; 210/195.1

(58) Field of Classification Search .............. None
See application file for complete search history.

(56) References Cited

U.S. PATENT DOCUMENTS 4,039,452 A * 8/1977 Fernandez ............ 210/106
4,055,499 A * 10/1977 Laxo ................... 210/119
5,096,598 A    3/1992 Pecen et al.
5,670,038 A    9/1997 McKinney
5,766,475 A    6/1998 Mayer et al.
6,022,481 A    2/2000 Blake
6,203,714 B1 * 3/2001 Bos et al. ............ 210/798
6,217,760 B1   4/2001 Bovington \* cited by examiner Primary Examiner—Krishnan S Menon
Assistant Examiner—Madeline Gonzalez
(74) Attorney, Agent, or Firm—Thompson & Knight LLP; James J. Murphy

(57) ABSTRACT

A filter system includes a distribution valve operable to direct a received fluid stream to first and second outlets during respective first and second cycles. A filtering system filters at least some fluid output from the first outlet of the distribution valve during the first cycle with a first filter while back-flushing a second filter and filters at least some fluid output from the second outlet of the distribution valve during the second cycle with the second filter while back-flushing the first filter.

10 Claims, 7 Drawing Sheets

FILTERING SYSTEMS WITH INTEGRAL FILTER BACK-FLUSHING

FIELD OF INVENTION

The present invention relates in general to fluid filtering techniques, and in particular to filtering systems with integral filter back-flushing.

BACKGROUND OF INVENTION

Fluid filtering technologies have been in existence for a very long time. Nevertheless, even the most sophisticated of these technologies are still subject to significant problems, including those related to the clogging and cleaning of the filters themselves. These problems are compounded when hazardous or toxic materials are involved, which make filter cleaning a difficult, and often hazardous, task.

Consider for example a system for recovering water from a typical septic system used in residences, small business enterprises, and the like. In this case, waste water received from a sewer line is first received in a trash tank where solid organic waste materials settle-out. The remaining effluent is then moved to an aerobic tank, using either pumping or gravity flow, where air is pumped into the effluent to help breakdown the remaining organic matter. The effluent is then moved, using either pumping or gravity flow, to a holding tank, where it is held and then periodically pumped out through a filter system to a leaching area. This leaching area can be, for example, a small plot of soil suitable for growing plants and can be serviced a drip irrigation system or similar means of water distribution coupled to the filter system.

As with many types of fluid filtering systems, the filter between the holding tank and the leaching area can become clogged and therefore require cleaning. In a septic system, cleaning the filter can not only be a difficult task, but also a hazardous one, given the organic nature of the waste being handled.

The need for more efficient fluid filtering systems suitable for a wide range of applications is generally desirable. Filtering techniques, which improve the efficiency and safety of systems handling potentially hazardous fluids, such septic system effluent, are particularly desirable.

SUMMARY OF INVENTION

The principles of the present invention are embodied in filtering systems that perform automatic back-flushing without human intervention. According to one representative embodiment, a filter system is disclosed that includes a distribution valve operable to direct a received fluid stream to first and second outlets during respective first and second cycles. A filtering system filters at least some fluid output from the first outlet of the distribution valve during the first cycle with a first filter while back-flushing a second filter and filters at least some fluid output from the second outlet of the distribution valve during the second cycle with the second filter while back-flushing the first filter.

Advantageously, the principles of the present invention provide for the design and construction of filtering systems that are subject to minimal clogging and/or that require minimal human intervention to maintain peak performance. Furthermore, when such filter systems are used in systems treating potentially hazardous materials, for example the effluent in septic systems, human exposure to such potentially hazardous materials is also minimized. Moreover, filter systems according to the inventive principles do not require electricity or a like power source to switch between operating cycles.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1A:
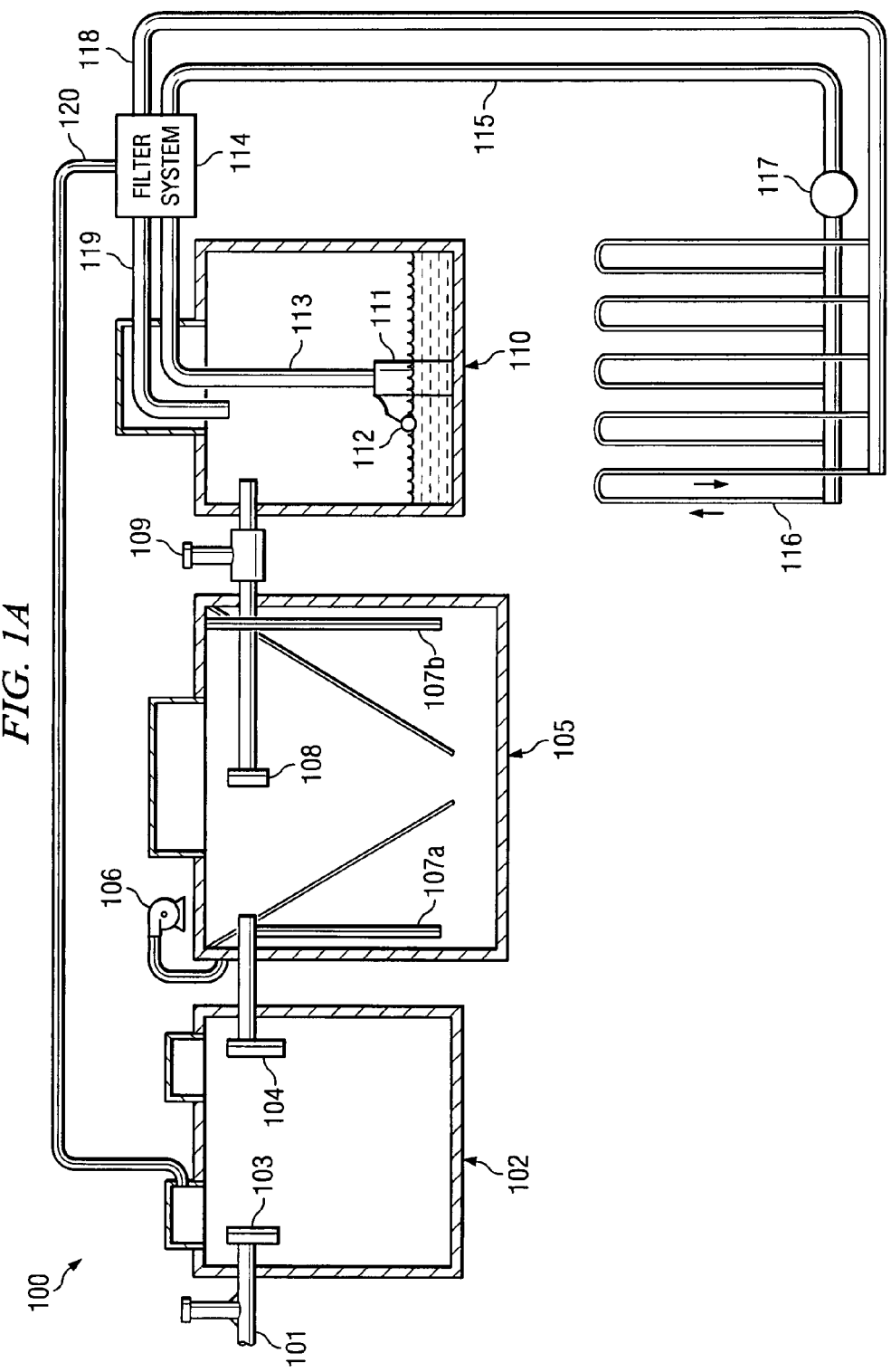
FIG. 1A is a block diagram of a typical septic/waste water recovery system suitable for describing one application of the principles of the present invention.

FIG. 1A is a diagram of an exemplary septic/waste water recovery system 100 suitable for describing one particular application of the principles of the present invention, although these principles can be applied to a wide range of other fluid filtering systems.

As shown in FIG. 1A, system 100 includes an effluent input line 101, which receives effluent from the drains of a house or small commercial concern. This effluent enters a trash tank 102 through trash tank inlet 103. Generally, the effluent remains in trash tank 102 while organic solids settle-out. After settling, the remaining liquid effluent in trash tank 102 is transferred through outlet 104 and inlet 107, using either pumping or gravity flow, into aerobic tank 105, where a pump 106 pumps air into the effluent to help break down any remaining organic matter.

Next, the effluent in aerobic tank 105 is transferred using either pumping or gravity flow through outlet 108 and an optional chlorinator 109 and into holding tank 110. An irrigation pump 111, controlled by a float 112, pumps fluid from holding tank 110 through a line 113 to filter system 114. Filter system 114, which embodies the principles of the present invention, will be described in further detail below. In the preferred embodiment, float 112 enables the operation of irrigation pump 111 when sufficient fluid resides at the bottom of holding tank 110. In addition, irrigation pump 111 includes a timer, such that when irrigation pump 111 is enabled by float 112, irrigation pump 111 periodically pumps fluid through filter system 114 for a predetermined amount of time.

In system 100, the filtered water pumped through filter system 114 passes through a line or pipe 115 to drip irrigation field lines 116 (i.e. the disposal field in this example). In the illustrated embodiment, a back-flush valve/vacuum break 117 is provided between line 115 and drip irrigation field lines 116. Return water flows through line or pipe 118 back through filter system 114 and line 119 into holding tank 110. An additional line, 120, allows water, which is used in the filter back-flushing operations described below and which potentially contains organic contaminates, to be returned to trash tank 102.

Figure 1B:
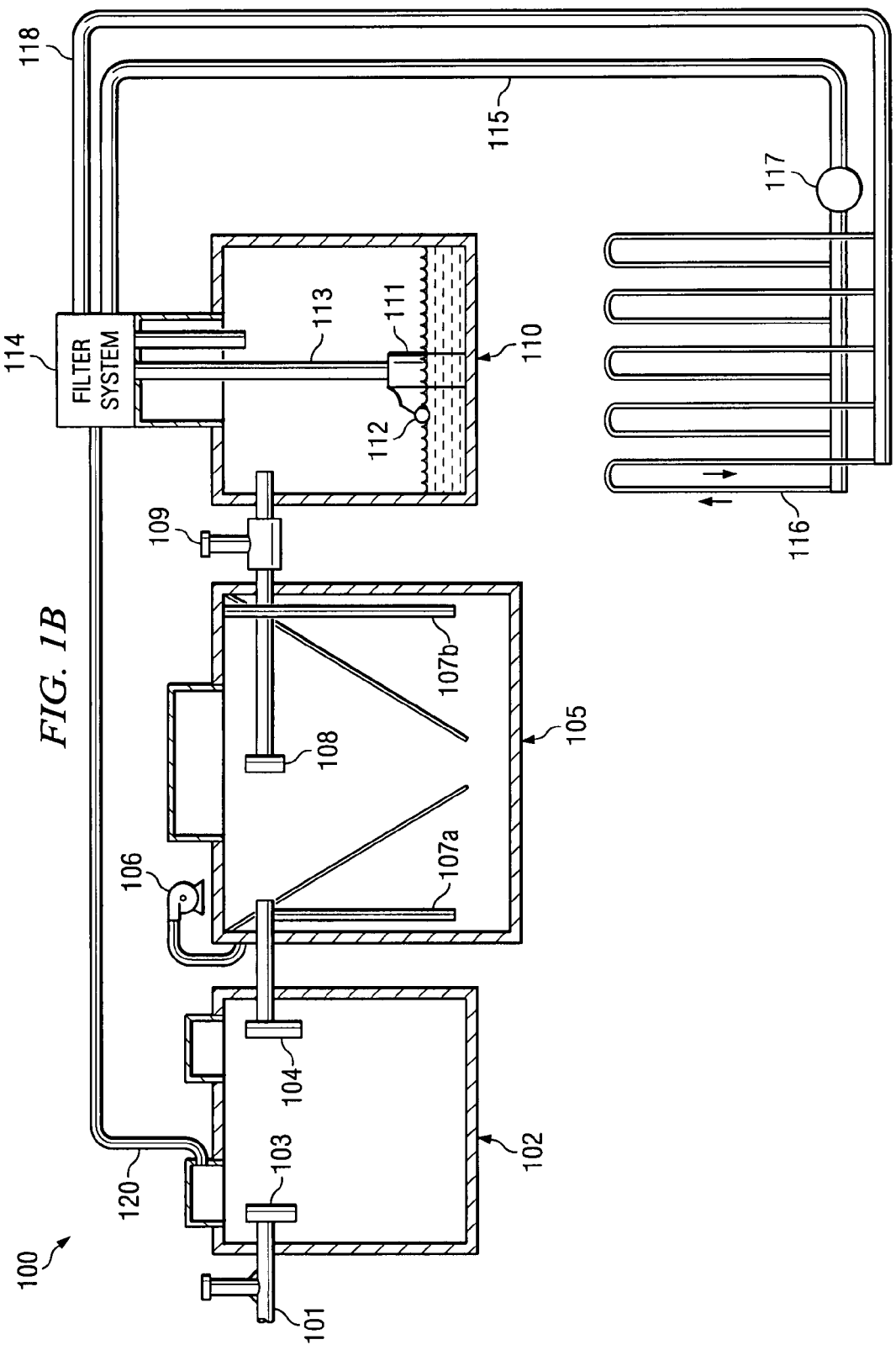
FIG. 1B is a diagram illustrating another typical septic/waste water recovery system suitable for describing the inventive principles.

FIG. 1B illustrates an alternate embodiment of septic system 100, which uses an alternate configuration of filter system 114. The two embodiments of system 100 shown in FIGS. 1A and 1B operate essentially the same way.

Figure 2A:
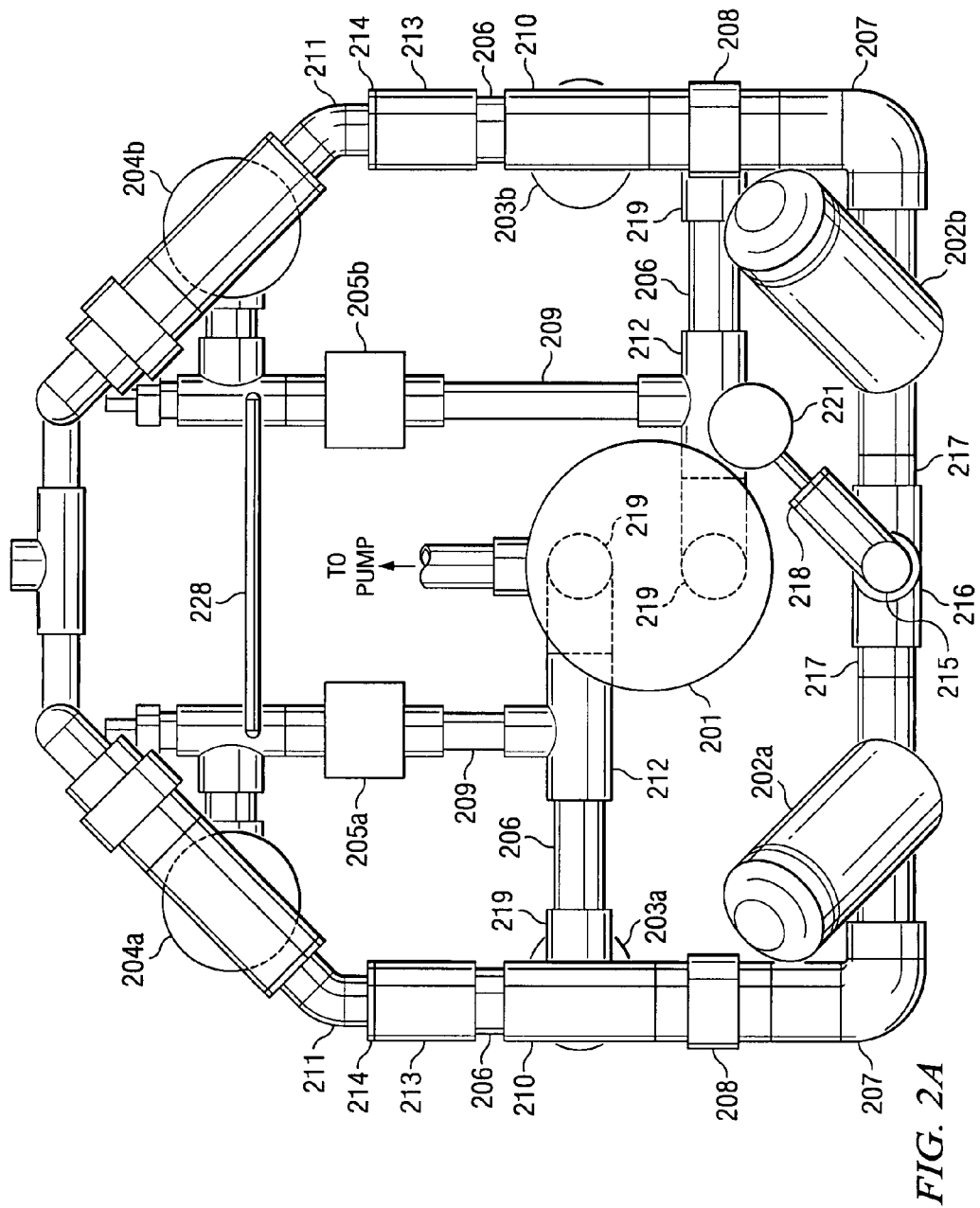
FIGS. 2A-2C are diagrams respectively showing top, side, and front-end views of a filtering system embodying the principles of the present invention and suitable for use in the systems shown in FIGS. 1A and 1B.
Figure 2B:
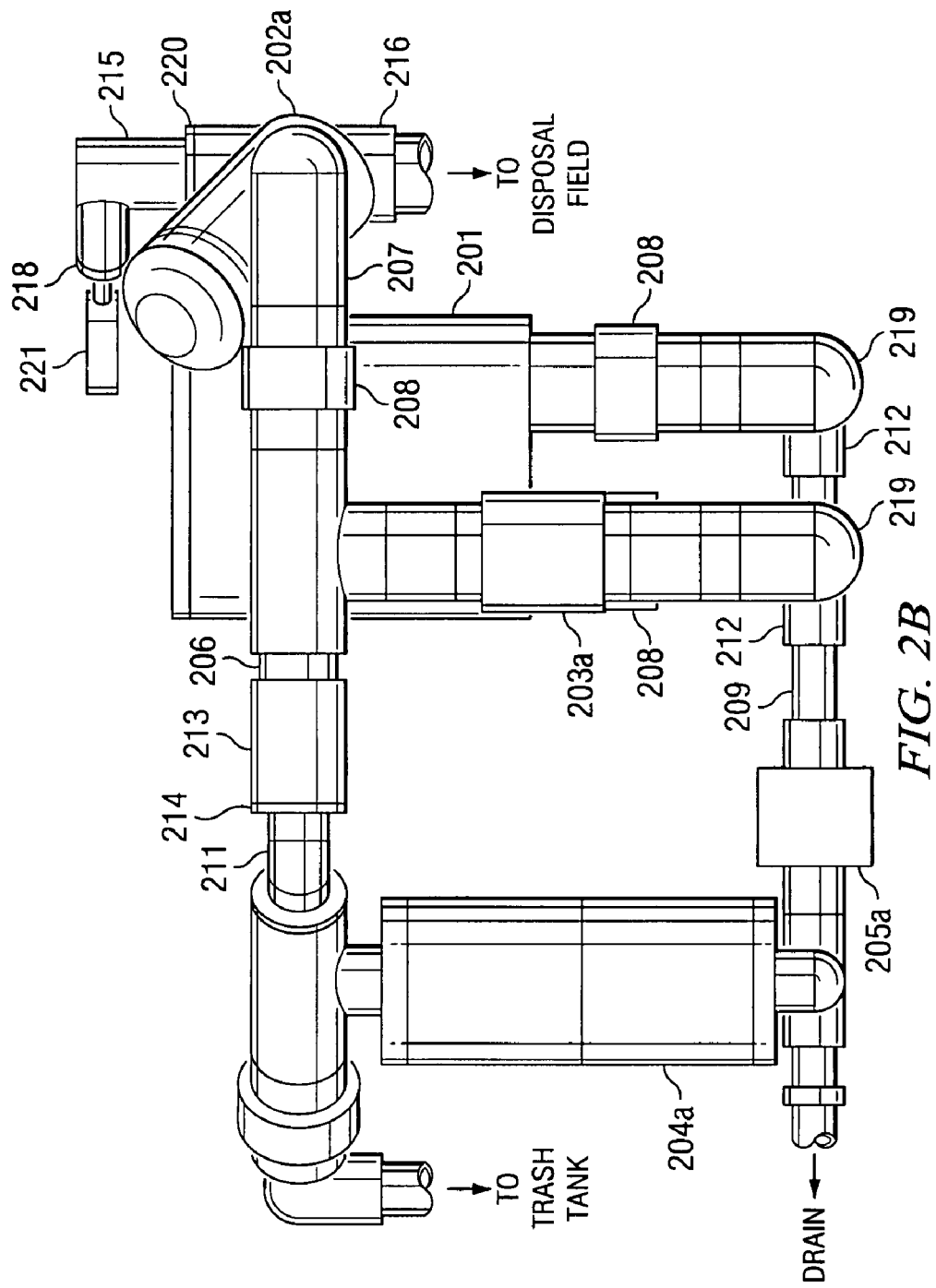
Figure 2C:
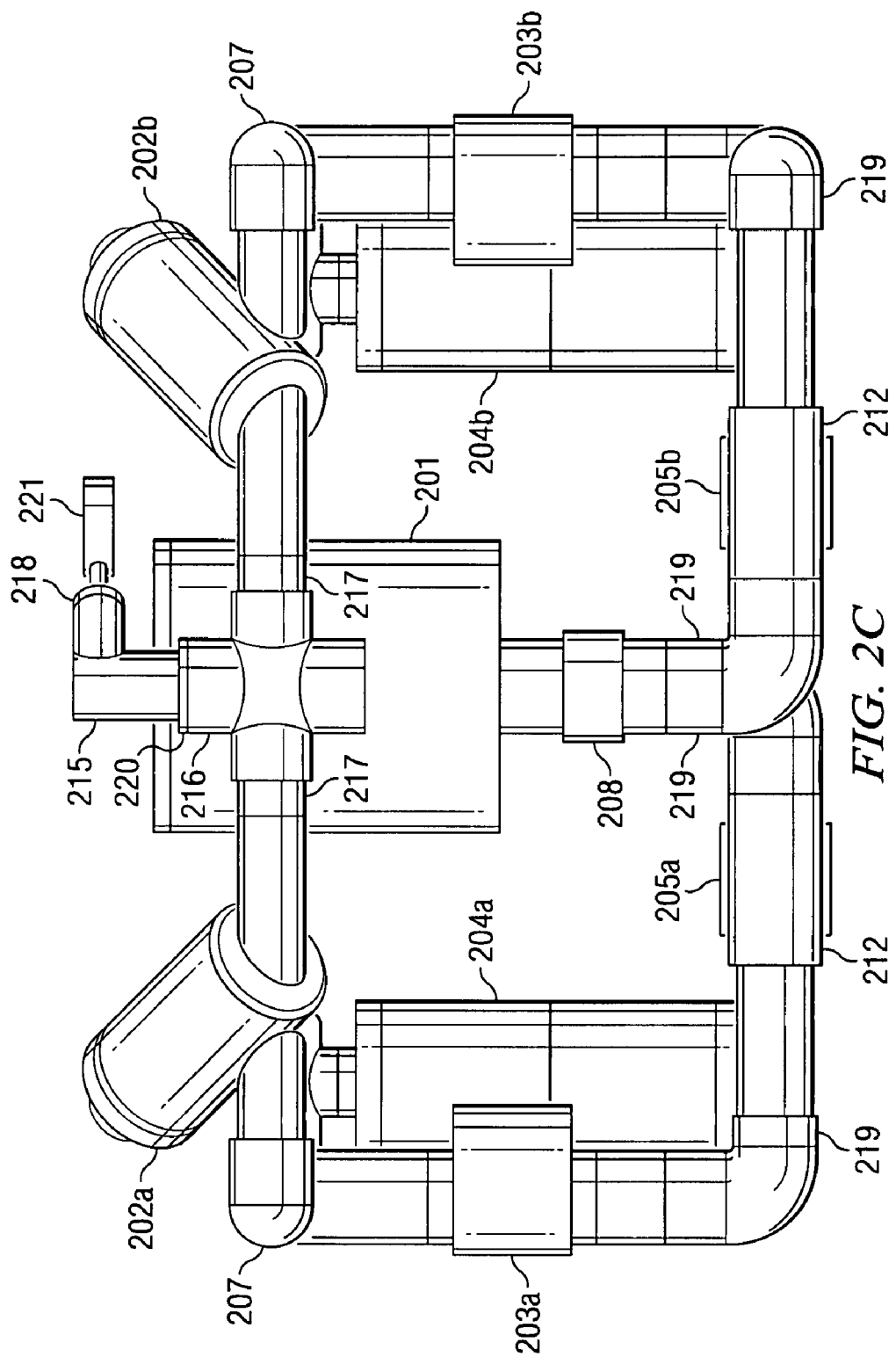

A preferred embodiment of Filter 114 shown in FIGS. 1A and 1B is shown in particular detail in FIGS. 2A-2C. Generally, filter system 114 includes at least two filtering subsystems, which provide fluid to the disposal area on alternate pump cycles. During at least a portion of each pump cycle, the filtering subsystem which is not being used to provide fluid to the disposal area is back-flushed to prevent clogging.

The embodiment of filter system 114 shown in FIGS. 2A-2C is based upon an automatic distribution valve 201. Automatic distribution value 201 is preferably a commercially available product, such at those available from K-Rain of West Palm Beach, Fla.

Automatic distribution valve 201 includes Ports A and B, which are alternately coupled to the associated fluid pump (not shown). In particular, Port A is coupled to a first filtering subsystem, the primary components of which are a standard effluent filter 202a, a check valve 203a, a flush valve 204a, and a check valve 205a. A second filter subsystem, coupled to Port B of automatic distribution valve 201, includes an effluent filter 202b, a check valve 203b, a flush valve 204b, and a check valve 205b. Advantageously, automatic distribution valve automatically 201 switches between Port A and Ports B on alternating pump cycles without the use of any electrical switching components. (It should be recognized that in alternate embodiments, automatic distribution valve 201 may have more than two (2) ports operating in multiple pump cycles to support a corresponding number of filter subsystems.)

Each subsystem A and B includes interconnection components including sections of pipe or tube 206, elbows 207, 211, and 219, unions 208, flexible sections of tube or pipe 209, T's 210, reducing tees 212, couplings 213, reducing bushing spigots 214, a 90 degree elbow 215, a cross 216, female adaptors 217, and a reducing elbow spigot 218. In the illustrated embodiment, each of these components is preferably made of PVC or similar material, although in alternate embodiments other materials, such as metal, may be used. System 100 also includes a 0-90 PSI pressure gauge 220.

Figure 3A:
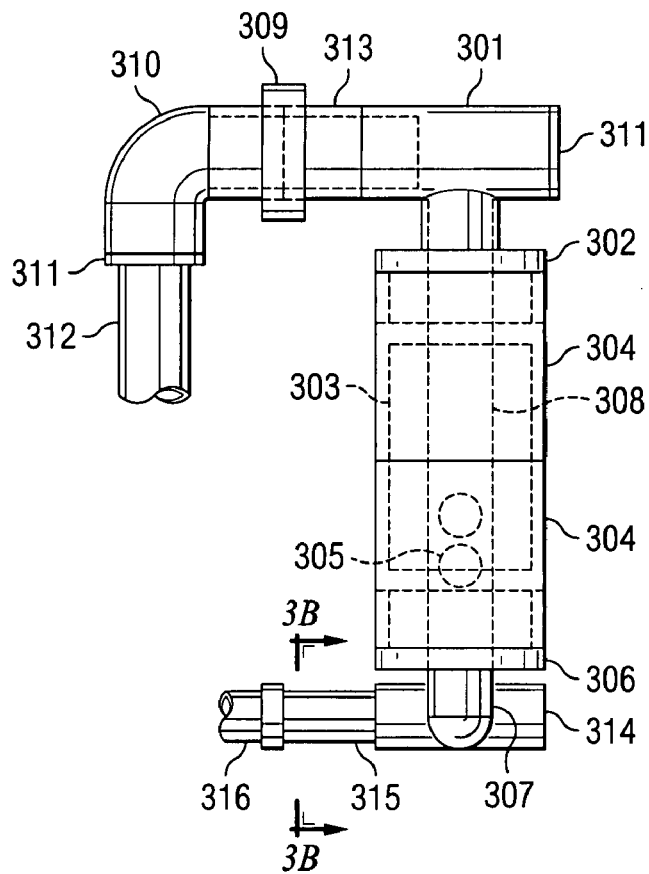
FIGS. 3A and 3B are more detailed diagrams of flush valves shown in FIGS. 2A-2C.
Figure 3B:
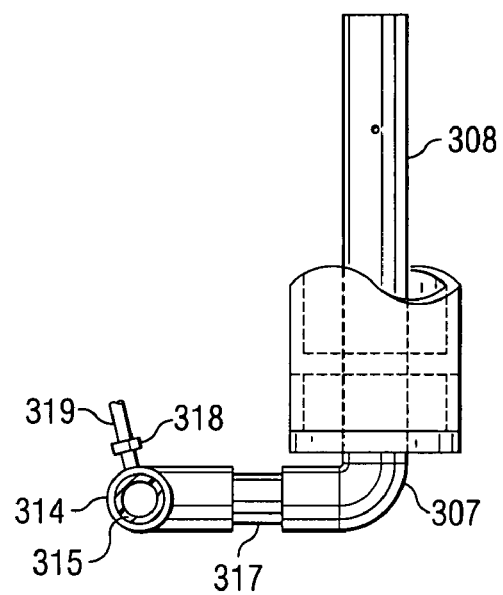

FIG. 3A is a more detailed diagram of a selected one of flush valves 204a and 204b of FIGS. 2A-2C. FIG. 3B is a partial view taken along Line 3B-3B of FIG. 3A.

The embodiment shown in FIG. 3A includes a tee 301 which couples to the corresponding conduit (pipe or tube) 211 shown in FIG. 2B through a bushing 311. One arm of tee 301 couples through a bushing 302 to a conduit (tube or pipe) 308, which is enclosed in a housing including a bushing 302, a conduit (pipe or tube) 303, couplings 304, and a bushing 306. Two buoyant plastic balls 305 are disposed within conduit 308.

The opposite side of conduit 308 is coupled through a tee 301 and a bull tee 314 to a hose adapter 315. Hose adapter 315 in turn connects through a pressure controlled drain valve 316 and line 119 back to holding tank 110 of FIGS. 1A and 1B. Bull tee 314 further couples through a barbed fitting 318 to a tube 319, which in turn connects to cross-feed 228 of FIG. 2A. In the illustrated embodiment, pressure controlled drain valve 316 opens when the pressure applied to bull tee 314 goes below 7 PSI.

Tee 301 further couples through a conduit (tube or pipe) 313, union 309, elbow 310, and bushing 311, to a conduit (pipe or tube) 312. Conduit 312 in turn connects through line 120 back to trash tank 102 of FIGS. 1A and 1B.

Figure 4A:
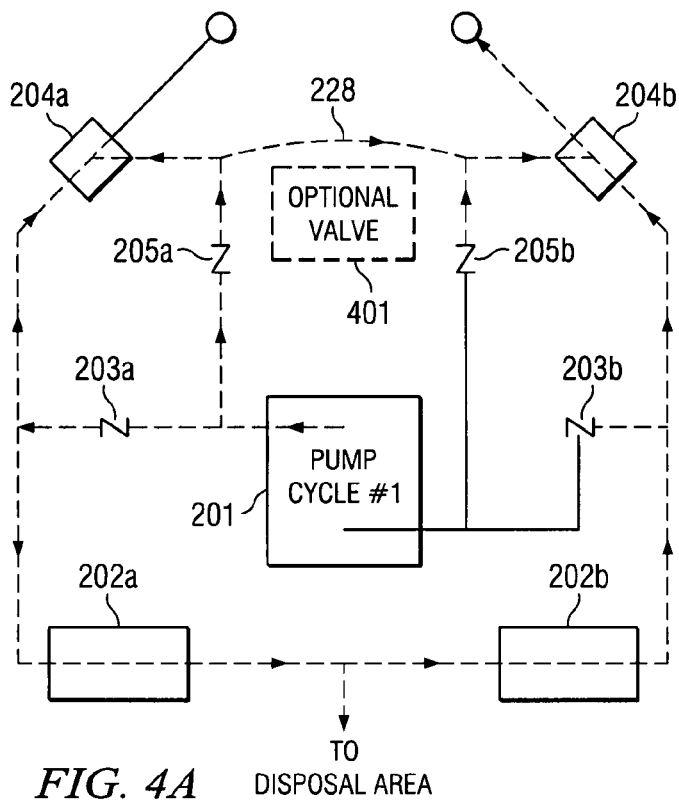
FIGS. 4A and 4B are conceptual flow charts illustrating the operations of the filter system shown in FIGS. 2A-2C.
Figure 4B:
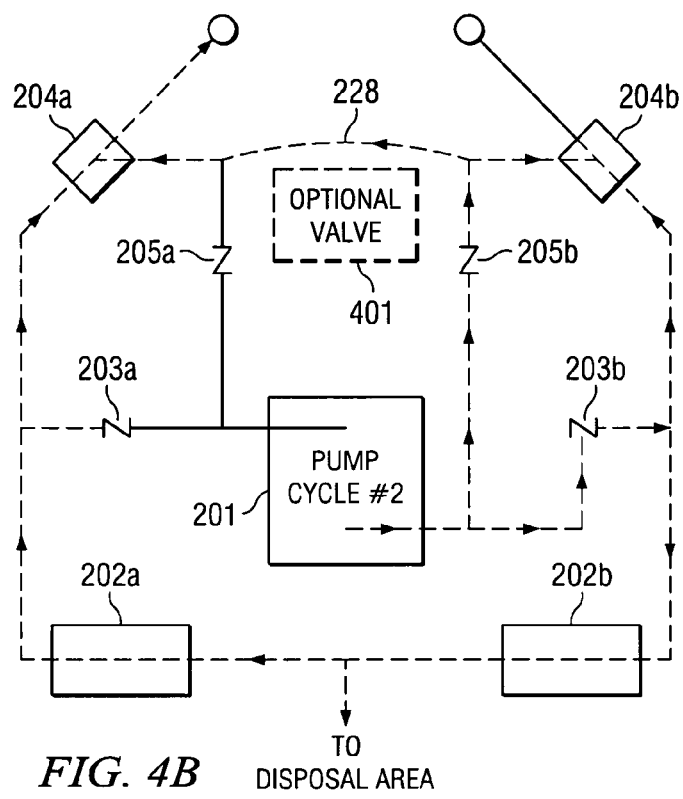

The operation of the preferred embodiment of filter system 114 shown in FIGS. 2A-2C and FIGS. 3A-3B is illustrated in FIGS. 4A and 4B, which generally depict fluid flow for two alternating pump cycles. In particular, FIG. 4A shows a typical cycle (Pump Cycle 1) in which fluid is being output from Port A of automatic distribution valve 201, subsystem A is providing fluid to the disposal area, and subsystem B is being back-flushed. FIG. 4B illustrates a typical cycle (Pump Cycle 2) in which fluid is being output from Port B of automatic distribution value 201, subsystem B is providing fluid to the disposal area, and subsystem A is being back-flushed. In FIGS. 4A and 4B, dashed lines indicate the movement of water, while solid lines indicate those portions of the system which are static (i.e. in which no fluid is flowing).

As shown in FIG. 4A, a portion of the fluid output from Port A of automatic distribution valve 201 flows through check valve 203a and through filter 202a in the forward direction. A portion of the fluid traveling through filter 202a goes on to the to the disposal area, while some of this fluid goes through filter 202b in the reverse direction, thereby back-flushing filter 202b.

Another portion of the fluid output from Port A of automatic distribution valve 201 flows through check valve 205a. This fluid flow causes buoyant balls 305 of flush valve 204a to rise and close flush valve 204a. At the same time, fluid through open check valve 205a begins to flow through tube 319 of bull tee 314 of flush valve 204a and cross-feed conduit 228. (During Pump Cycle 1, since no fluid is flowing through Port B of automatic distribution valve 201, check valve 205b is closed.)

The fluid flowing through cross-feed conduit 228 begins to force buoyant plastic balls 305 within flush valve 204b to rise. By controlling the diameter of cross-feed to tube 228, the rate at which buoyant plastic balls 305 rise can be controlled, and hence the time during which flush valve 204b remains open.

During the period in which buoyant balls 305 within flush valve 204b are rising, back-flushing fluid flowing through filter 202b is allowed to pass through flush valve 204b and back to trash tank 102 of FIGS. 1A and 1B. Advantageously, any hazardous contaminates which have accumulated within filter 202b are flushed back into trash tank 102 without either leaving the system or coming in to human contact.

Once buoyant plastic balls 305 of flush valve 204b reach the corresponding tee 301, flush valve 204b turns off, and back-flushing of filter 202b stops. Fluid continues to be pumped through filter 202a and on to the disposal area during Pump Cycle 1.

At the end of Pump Cycle 1, fluid flow through open check valve 205a stops, and hence no pressure is applied to pressure controlled drain valve 316 of flush valve 204a. Additionally, the fluid flow through cross-feed tube 228 to flush valve 204b also stops. Consequently, without pressure being applied, pressure controlled drain valves 316 of both flush valves 204a and 204b open, and the fluid within the respective conduits 308 drains back into holding tank 110. The corresponding buoyant plastic balls 305 fall and flush valves 204a and 204b are ready for Pump Cycle 2.

Pump cycle 2, as shown in FIG. 4B, proceeds similar to Pump Cycle 1 shown in FIG. 4A. In this case, filter 202b is providing fluid to the disposal area, while filter 202a is being back-flushed under the control of flush valve 204a.

In an alternate embodiment, a ball valve or similar valve can be disposed within the fluid path of cross-feed 228 of FIG. 2A to control the back-flushing duration. This optional valve 401 is shown in broken lines in FIGS. 4A and 4B. In particular, to decrease the rate of back-flushing, valve 401 is opened to increase the rate of flow into the given flush valve 204, with the shortest back-flushing period resulting when valve 401 is fully open. On the other hand, to increase the rate of back-flushing valve 401 is closed to decrease the flow into the given flush valve 204.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A filter system comprising:
   a distribution valve operable to direct a received fluid stream to a first outlet during a first cycle and a second outlet during a second cycle;
   a filtering system including first and second filters and operable to:
      filter at least some fluid output from the first outlet of the distribution valve during the first cycle with the first filter while back-flushing the second filter; and
      filter at least some fluid output from the second outlet of the distribution valve during the second cycle with the second filter while back-flushing the first filter;
   a first valve for coupling fluid from the first outlet of the distribution valve through the first filter in a forward direction and through the second filter in a reverse direction;
   a second valve having an inlet for receiving fluid for controlling the reverse direction fluid flow through the second filter to control back-flushing duration, the second valve comprising:
      a flow conduit including the inlet and an outlet for passing reverse direction fluid flow from the second filter during back-flushing; and
      a float mechanism for controlling fluid flow through the flow conduit comprising a control conduit and a float disposed within the control conduit, a time for the float to travel through the control conduit in response to fluid introduced into the control conduit and reach the flow conduit and impede flow between the inlet and the outlet of the flow conduit setting a back-flushing duration, wherein the back-flushing duration is set to sufficiently back-flush the second filter and to be less than a duration of fluid flow in the forward direction through the first filter;
   a third valve including another float mechanism for receiving fluid for controlling reverse direction fluid flow through the first filter to control back-flushing duration during the second cycle; and
   a fourth valve for providing fluid to the third valve to cause the float mechanism of the third valve to impede flow through the third valve during the first cycle;
   a fifth valve for coupling fluid from the second outlet of the distribution valve through the second filter in a forward direction and through the first filter in a reverse direction during the second cycle; and
   a sixth valve for providing fluid to the flow conduit of the second valve to cause the float mechanism to impede flow through the flow conduit of the second valve during the second cycle.

2. The filter system of claim 1, further comprising drain valve responsive to a change in fluid pressure for draining fluid from the control conduit of the second valve.

3. The filter system of claim 1, wherein the third valve comprises:
   another flow conduit having an inlet and an outlet for passing reverse direction fluid flow from the second filter during back-flushing during the second cycle; and
   the another float mechanism for controlling fluid flow through the another flow control conduit comprising another control conduit and another float disposed within the another control conduit, a time for the float to travel through the another control conduit in response to fluid introduced into the another control conduit and reach the another flow conduit and impede flow through the another flow conduit setting the back-flushing duration during the second cycle, wherein the back-flushing duration during the second cycle is set to sufficiently back-flush the first filter and to be less than a duration of fluid flow in the forward direction through the second filter.

4. The filter system of claim 3, further comprising drain valve responsive to a change in fluid pressure for draining fluid from the another control conduit of the third valve.

5. A filter system comprising:
   a distribution valve operable to direct a received fluid stream to a first outlet during a first cycle and a second outlet during a second cycle;
   a first valve operable during the first cycle to couple fluid from the first outlet of the distribution valve through the first filter for output from the system and through the second filter for back-flushing;
   a second valve for controlling back-flushing duration through the second filter during the first cycle, comprising:
      a flow conduit including the inlet and an outlet for passing reverse direction fluid flow through the second filter during back-flushing; and
      a float mechanism for controlling fluid flow through the flow conduit comprising a control conduit and a float disposed within the control conduit, a time for the float to travel through the control conduit in response to fluid introduced into the control conduit and reach the flow conduit and impede flow between the inlet and the outlet of the flow conduit setting a back-flushing duration, wherein the back-flushing duration is set to sufficiently back-flush the second filter and to be less than a duration of fluid flow in the forward direction through the first filter;
   a third valve operable during the second cycle to couple fluid from the second outlet of the distribution valve through the second filter for output from the system and through the first filter for back-flushing;
   a fourth valve for controlling back-flushing duration through the first filter during the second cycle, comprising:
      another flow conduit having another inlet and an another outlet for passing reverse direction fluid flow from the second filter during back-flushing during the second cycle; and another float mechanism for controlling fluid flow through the another
conduit comprising another control conduit and another float disposed within the another control conduit, a time for the another float to travel through the another control conduit in response to fluid introduced into the another control conduit and reach the another flow conduit and impede flow between the another inlet and the another outlet of the another flow conduit setting another selected back-flushing duration during the second cycle, wherein the another selected back-flushing duration is set to sufficiently back-flush the first filter and to be less than a duration of fluid flow in he forward direction through the second filter;

a fifth valve operable during the second cycle to provide fluid to the control conduit of the second valve to cause the float mechanism of the second valve to impede flow through the flow conduit of the second valve during the second cycle; and a sixth valve operable during the first cycle to provide fluid to the another control conduit of the fourth valve to cause the float mechanism of the fourth valve to impede flow through the another flow conduit of the fourth valve during the first cycle.

6. The system of claim 5, wherein the second and fourth valves further comprise a drain valve responsive to a change in fluid pressure for draining fluid from the control conduit and the another control conduit.

7. A fluid recovery system comprising:

a first tank for storing potentially hazardous fluid;

a second tank for holding fluid received from the first tank after treatment; and a filter system for filtering at least some fluid pumped from the second tank with a first filter while concurrently back-flushing a second filter with at least some fluid pumped from the second tank, wherein the fluid back-flushing the second filter is returned to the first tank for a selected back-flushing duration after which back-flushing of the second filter is substantially halted while the at least some fluid pumped from the second tank continues to be filtered by the first filter, the filter system comprising:

a first valve for coupling fluid from the first outlet of the distribution valve through the first filter in a forward direction and through the second filter in a reverse direction;

a second valve having an inlet for receiving fluid for controlling the reverse direction fluid flow through the second filter to control back-flushing duration, the second valve comprising:

a flow conduit including the inlet and an outlet for passing reverse direction fluid flow from the second filter during back-flushing; and a float mechanism for controlling fluid flow through the flow conduit comprising a control conduit and a float disposed within the control conduit, a time for the float to travel through the control conduit in response to fluid introduced into the control conduit and reach the flow conduit and impede flow between the inlet and the outlet of the flow conduit setting a back-flushing duration, wherein the back-flushing duration is set to sufficiently back-flush the second filter and to be less than a duration of fluid flow in the forward direction through the first filter;

a third valve including another float mechanism for receiving fluid for controlling reverse direction fluid flow through the first filter to control back-flushing duration during the second cycle; and a fourth valve for providing fluid to the third valve to cause the float mechanism of the third valve to impede flow through the third valve during the first cycle;

a fifth valve for coupling fluid from the second outlet of the distribution valve through the second filter in a forward direction and through the first filter in a reverse direction during the second cycle; and a sixth valve for providing fluid to the flow conduit of the second valve to cause the flow mechanism to impede flow through the flow conduit of the second valve during the second cycle.

8. The fluid recovery system of claim 7, wherein the filter system is further operable to filter at least some fluid pumped from the second tank with the second filter while concurrently back-flushing the first filter with at least some fluid pumped from the second tank, wherein the fluid back-flushing the first filter is returned to the first tank.

9. The fluid recovery system of claim 7, wherein the first tank stores organic waste.

10. The fluid recovery system of claim 7, wherein the first and second tanks comprise a portion of a septic system.

* * * * *